UNITED STATES PATENT OFFICE.

BERNARD M. O'NEILL, OF ST. LOUIS, MISSOURI.

CEMENT FOR CHIMNEYS, ROOFS, &c.

SPECIFICATION forming part of Letters Patent No. 304,124, dated August 26, 1884.

Application filed April 12, 1884. (No specimens.)

*To all whom it may concern:*

Be it known that I, BERNARD M. O'NEILL, of St. Louis, Missouri, have made a new and useful Improvement in Cements, of which the following is a full, clear, and exact description.

This cement is of especial value in the construction of chimneys and roofs, but can also be used in many other places.

It consists in the ingredients combined substantially as hereinafter described, and designated in the claim.

Of sand, take by measure one part; of yellow clay, take by measure two parts; of ashes—such as soft-coal ashes—take by measure six parts. Thoroughly mix these ingredients together, and combine therewith enough linseed-oil to make a plastic compound, using therefor by measure nearly as much oil as ashes. I do not desire, however, to be confined strictly to these proportions. This cement is strong, fire-proof, and water-proof.

I am aware that limestone, sand, Portland cement, dry zinc, and linseed-oil have been combined to form an adhesive cement, and also that blue clay, ashes, and lime have been combined to form a hydraulic cement. I therefore do not claim such compounds; but

I claim—

The herein-described cement, the same consisting of sand, clay, ashes, and linseed-oil combined substantially in the proportions specified.

Witness my hand.

BERNARD M. O'NEILL.

Witnesses:
 CHAS. D. MOODY,
 ADOLPHUS I. LUSTIG.